US006338373B1

(12) United States Patent
Forbes et al.

(10) Patent No.: US 6,338,373 B1
(45) Date of Patent: Jan. 15, 2002

(54) COMPACT, LOW-CLEARANCE, TRACTION ASSIST DEVICE

(75) Inventors: James W. Forbes; Alan David Brunning, both of Essex (GB)

(73) Assignee: Ford Motor Company, Dearborn, MI (US)

(*) Notice: Subject to any disclaimer, the term of this patent is extended or adjusted under 35 U.S.C. 154(b) by 16 days.

(21) Appl. No.: 09/609,557

(22) Filed: Jun. 30, 2000

(51) Int. Cl.[7] .............................................. B60C 11/00
(52) U.S. Cl. ................ 152/221; 152/213 R; 152/225 R
(58) Field of Search .............................. 152/213 R, 216, 152/213 A, 221, 223, 224, 225 R, 227, 228, 231, 239; 301/41.1, 42, 45, 46

(56) References Cited

U.S. PATENT DOCUMENTS

| | | |
|---|---|---|
| 1,718,509 A | 6/1929 | West |
| 1,932,576 A | 10/1933 | Dodge .......................... 152/14 |
| 4,280,544 A | 7/1981 | White .......................... 152/221 |
| 4,346,748 A | 8/1982 | Bagoy et al. ................ 152/222 |
| 4,716,949 A | 1/1988 | Lee .............................. 152/216 |
| 4,919,182 A | 4/1990 | Proulx et al. ................ 152/221 |

Primary Examiner—S. Joseph Morano
Assistant Examiner—Long Rao Nguyen
(74) Attorney, Agent, or Firm—Gregory P. Brown; William J. Coughlin

(57) ABSTRACT

A traction assist device (16) adapted for girdling a motor vehicle tire (10) is fabricated as a nominally flat polymeric part that can assume a circular shape for fitting onto the tire. The part has a pair of side bars (18, 20) that are nominally straight, but assume circular shapes for fitting against opposite side walls (14) of the tire. A number of transverse bars (22) integrally joining with the side bars extend between the side bars at intervals along the length of the side bars. Each transverse bar is nominally straight, but wraps over the tire tread (12) when the device is installed. Respective ends (32, 34) of the side bars cooperatively form a respective connector (36) for connecting the respective ends together using interlocking serrated zones (40, 54). One zone (54) is on a pawl (54) that can be released to allow the ends to be separated.

14 Claims, 2 Drawing Sheets

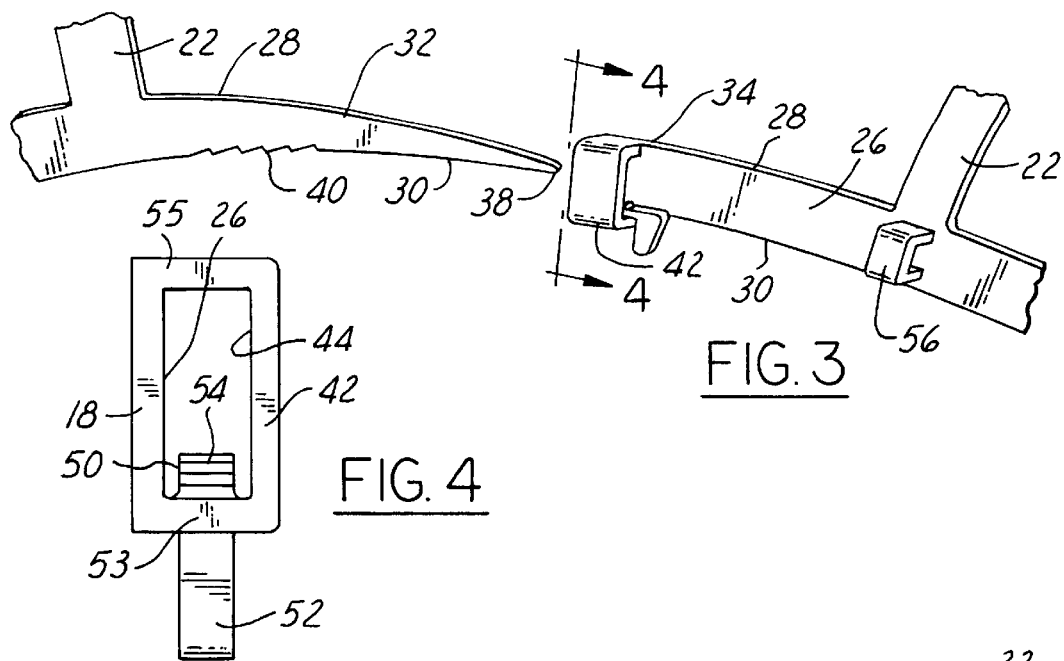
FIG. 3
FIG. 4
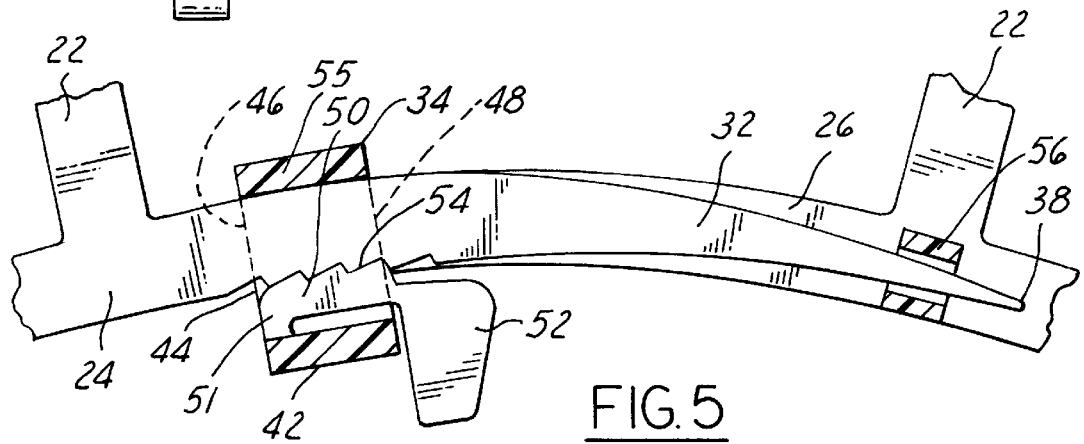
FIG. 5
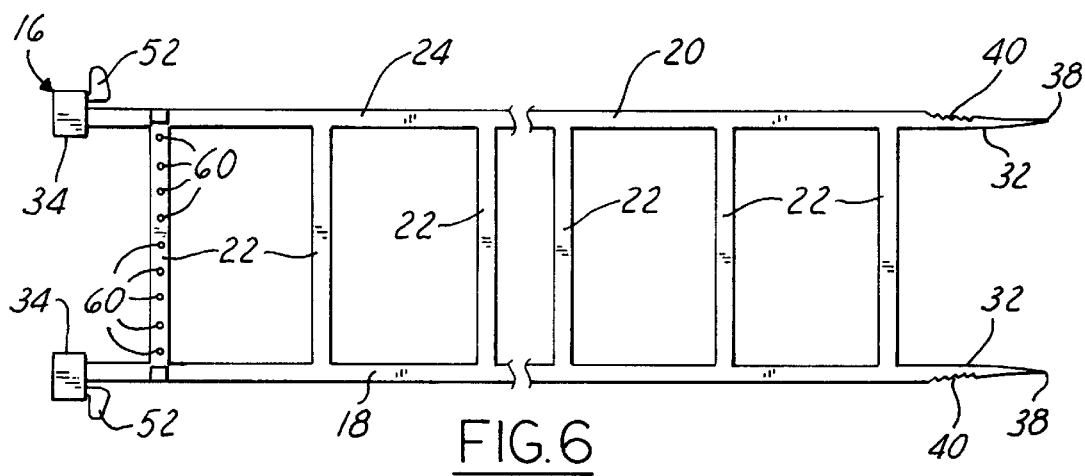
FIG. 6

COMPACT, LOW-CLEARANCE, TRACTION ASSIST DEVICE

BACKGROUND OF THE INVENTION

1. Field of the Invention

This invention relates to a device for mounting on a vehicle wheel in girdling relation to a tire to enhance traction of the tire with an underlying surface on occasions when the condition of the surface degrades traction between itself and the tire tread. The device is intended for use during winter driving conditions when a vehicle may at times have to travel on ice and/or snow.

2. Background Information

For many reasons, tire packaging is a significant consideration in the design of a motor vehicle. Suspension and steering systems define geometric envelopes for relative positions of wheels and tires with respect to a vehicle body and chassis. The design of a particular vehicle model may call for an ability to accept a range of size tires. Tire packaging also bears on vehicle appearance and handling characteristics.

The design of mass-produced motor vehicles typically calls for tire packaging that permits the mounting of traction assist devices, such as tire chains, on the wheels, even if such devices will actually be used on only a relatively small percentage of all such vehicles. Because such devices girdle the profile of a wheel-mounted tire in covering relation to both tire tread and tire side walls, sufficient dimensional clearances must be designed into the geometry of a mass-produced vehicle beyond those required to accommodate the various design considerations mentioned above. Accordingly, it would be desirable if the extra dimensional clearances that have to be designed into a motor vehicle to accommodate such traction assist devices could be minimized. However the ability to minimize those clearances is largely dependent on minimizing the size of the traction assist device itself.

Besides the fairly popular metal tire chains, there are other traction assist devices that are already known, although perhaps not as extensively used. They include tire cables, single-sided chains, and studded shells, and some may allow a vehicle manufacturer to reduce dimensional clearances between tire envelopes and the body and chassis of a motor vehicle when compared to clearances required for metal tire chains.

A preliminary novelty search developed the following U.S. Pat. Nos. 1,718,509; 1,932,576; 4,280,544; 4,346,748; 4,718,949; and 4,919,182. As suggested by this state of the art, traction assist devices can be fabricated from synthetic materials (i.e. plastics). Those devices can wrap fairly snugly around a tire to girdle the tread, and as the wheel revolves, they are not prone to slinging rungs of a tire chain outwardly as known metal tire chains are apt to do.

Various means are employed to secure the known traction assist devices in place on a wheel and tire. For certain devices a number of separate parts are required, and tools may also have to be used to join parts fast to one another. It is believed that improvements in securing a traction assist device in place on a wheel and tire, especially a device fabricated from synthetic material to have a low-profile, would be a useful advance in traction assist technology that could aid not only in minimizing clearance requirements but also in facilitating installation of the device on a vehicle wheel.

SUMMARY OF THE INVENTION

The invention relates to a traction assist device which can be mounted on a motor vehicle tire to girdle the tire in a low-profile relation to the tire tread, which can be conveniently and quickly mounted without having to assemble individual parts and fasten them together, which can be installed manually without the use of tools, which allows slack in the fit to a tire to be taken out so that the device can be more tightly secured on the tire, which can be economically fabricated, and which enables a vehicle to be designed with smaller clearances between tire envelopes and a vehicle body and chassis.

A general aspect of the invention relates to a traction assist device for girdling a motor vehicle tire comprising a pair of side bars for fitting against opposite side walls of the tire and a number of transverse bars extending between the side bars at intervals along the length of the side bars. Each transverse bar extends from one of the side bars and across a tread of the tire to the other side bar when the device is mounted on the tire. Each side bar comprises respective ends that cooperatively form a connector for connecting the respective ends together when the device is mounted on the tire. One end of each side bar comprises a male connector portion of the respective connector and the opposite end of each side bar comprises a female connector portion of the respective connector within which the corresponding male connector portion is received when the respective connector portions are connected together. Each male connector portion comprises a serrated zone containing serrations. A respective pawl is associated with each female connector portion and comprises a serrated zone containing serrations for engaging at least one serration of the serrated zone of the respective male connector portion with at least one serration of the serrated zone of the respective female connector portion when the device is mounted on the tire.

Another general aspect of the invention relates to a traction assist device adapted for girdling a motor vehicle tire and comprising a nominally flat polymeric part that can assume a circular shape for fitting onto a tire. The polymeric part comprises a pair of side bars that are nominally straight, but can assume circular shapes for fitting against opposite side walls of the tire. The polymeric part further comprises a number of transverse bars integrally joining with the side bars and extending between the side bars at intervals along the length of the side bars. Each transverse bar is nominally straight, but when the device is mounted on the tire, each transverse bar fits closely against the tire, extending from one of the side bars, thence wrapping over and across a tread of the tire to the other side bar. Each side bar further comprises respective ends that cooperatively form a respective connector for connecting the respective ends together when the device is mounted on the tire.

Further aspects will be seen in various features of a presently preferred embodiment of the invention that will be described in detail and in principles of the invention as set forth in various claims.

BRIEF DESCRIPTION OF THE DRAWINGS

The drawings that will now be briefly described are incorporated herein to illustrate a preferred embodiment of the invention and a best mode presently contemplated for carrying out the invention.

FIG. 3 is a view similar to FIG. 2 showing a step in the process of securing the device to the tire.

FIG. 4 is an enlarged view in the direction of arrows 4—4 in FIG. 3.

FIG. 5 is a cross section view in the direction of arrows 5—5 in FIG. 2 with the device fully secured on the tire.

FIG. 6 is a plan view, on a reduced scale, of the device shown by itself as fabricated before installation on a tire, with an intermediate portion of the device removed for purposes of the illustration.

DESCRIPTION OF THE PREFERRED EMBODIMENTS(S)

Figure 1:
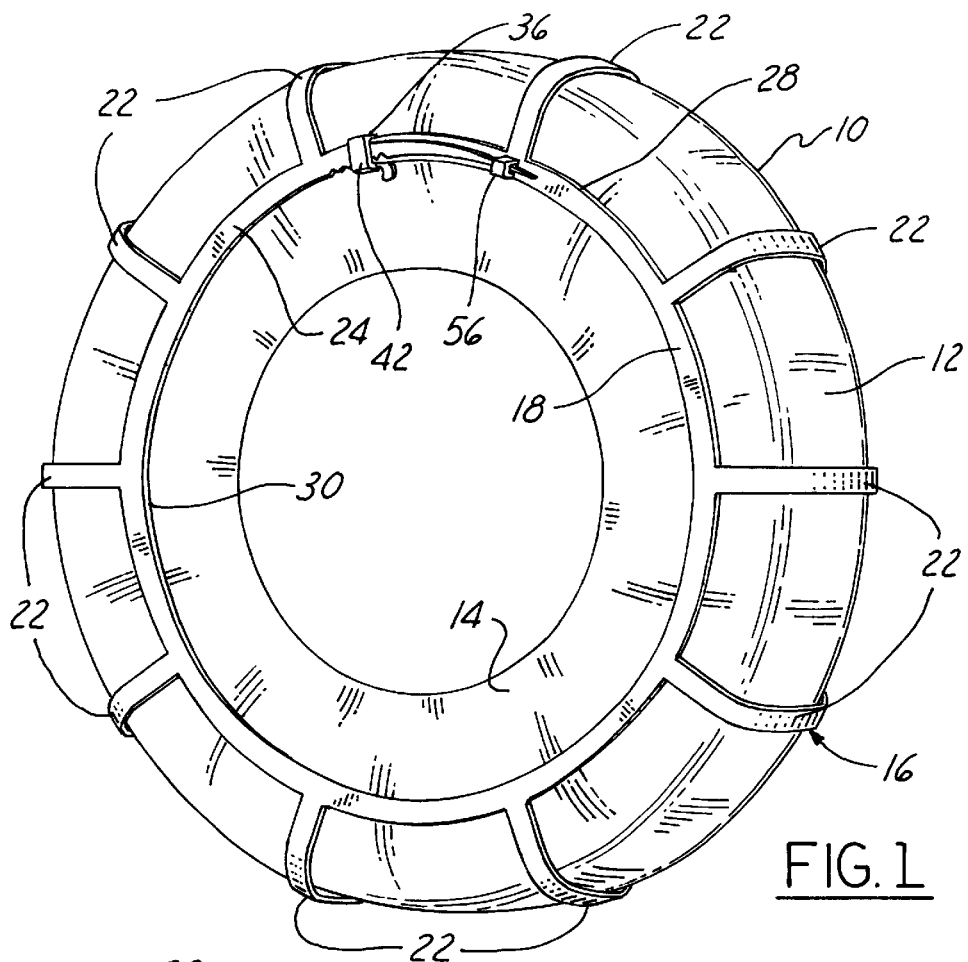
FIG. 1 is a perspective view, from the side, of a tire on which is mounted an exemplary embodiment of traction assist device according to principles of the present invention.
Figure 2:
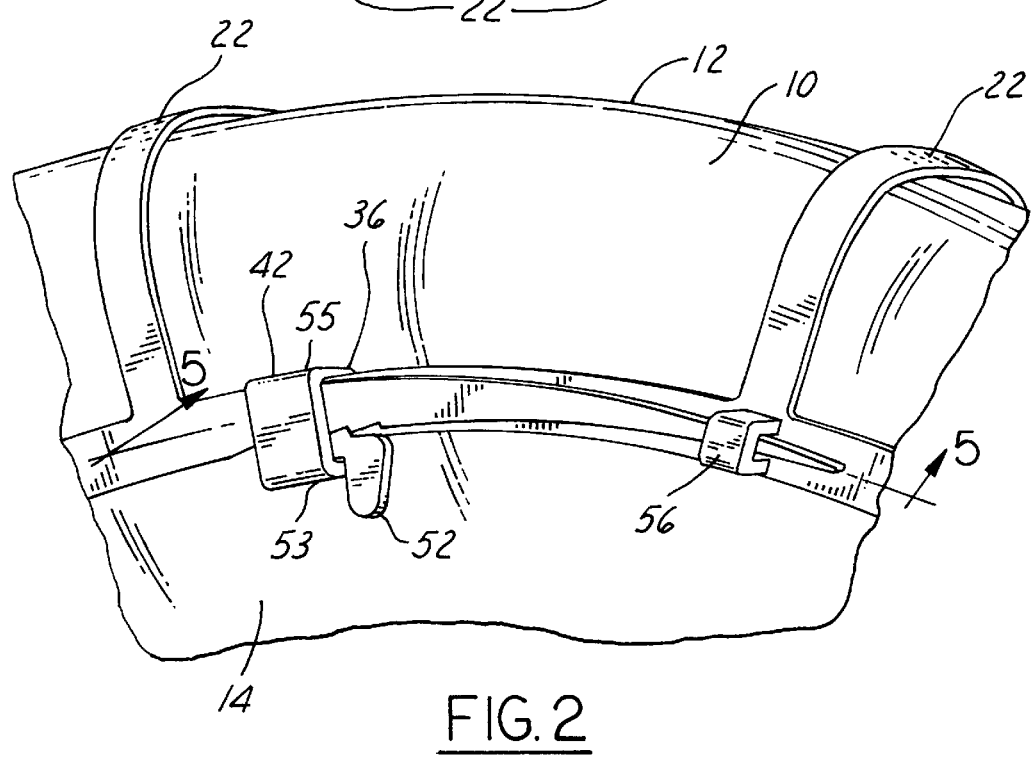
FIG. 2 is an enlarged view in oval 2 of FIG. 1.

FIG. 1 shows a representative tubeless pneumatic tire 10 having a tread 12 and opposite side walls 14. The radially inner margins of side walls 14 have beads that seal the tire to rims of a metal wheel (not shown) on which the tire mounts. A traction assist device 16 embodying principles of the invention is shown mounted on tire 10.

FIG. 6 shows the shape of device 16 as fabricated, before mounting on a tire. That shape is nominally flat, with the device having an overall ladder-like appearance, comprising lengthwise extending, generally parallel, side bars 18, 20. Transverse bars, or rungs, 22 span side bars 18, 20 at regular intervals along the length of device 16. The drawings show both side bars 18, 20 and rungs 22 of this particular embodiment of device to have transverse cross sectional shapes that are rectangular, but other embodiments may have cross sectional shapes that are non-rectangular. The plan view of FIG. 6 shows one 24 of the two wider faces 24, 26 (face 26 is marked in FIG. 5) of the rectangular cross sections of each side bar and rung. When the device is installed on tire 10 as in FIG. 1, the other wider faces 26 of the side bars and rungs are toward the tire. The dimension across opposite narrower faces 28, 30 (see FIG. 3) of the rectangular cross sections define a nominal thickness of device 16, and it is the combination of that relative narrowness in thickness and of how snugly the device fits on a tire that defines the extent to which the device increases the geometric envelope of the tire on a vehicle. It is believed that the increase is quite modest, thereby minimizing clearances that are designed into a vehicle to accommodate the devices. Although the illustrated embodiment has the same nominal thickness throughout both side bars and rungs, it is contemplated that other embodiments may have different thicknesses for the side bars and rungs. FIG. 1 shows the completed installation where side bars 18, 20 are disposed against respective side walls 14 of tire 10, and where each rung 22 extends from a respective side bar first radially outward, thence wraps over and across tread 12 to the opposite side bar.

Device 16 is fabricated from plastic material using known plastic molding methods. Various materials are believed suited, but any particular material should be sufficiently tough to endure service when installed on a tire. Any device may possess certain design features and/or certain material properties that provide for it to snugly girdle the tire at time of installation as in the manner portrayed by FIG. 1. In this way an installed device will conform to the contour of the tire profile.

For securing device 16 on tire 10, and as suggested by FIG. 3, opposite ends of each side bar connect together as the wrapping of the device around the tire is being completed. Opposite ends of each side bar comprise respective portions 32, 34 of a respective connector 36. One end of each side bar comprises a male connector portion 32, and the opposite end, a female connector portion 34.

Each male connector portion 32 is formed by tapering the end of the respective side bar to a somewhat pointed tip 38.

The taper is imparted to faces 28 and 30, progressively narrowing until the side bars finally end at tips 38. As further shown by Figures such as FIGS. 2, 4, 5, and 6, the tapering may be dimensioned such that the respective portions of the side bars are actually endowed with a slightly curved shape, as viewed in plan, so that when the device is being installed and opposite ends of each side bar are in the process of being connected together, the curvature may aid in completing the connection. The taper along face 28 is unserrated. The taper along face 30 contains a serrated zone 40 that is spaced from tip 38. Between the serrated zone and the tip, face 30 is unserrated.

Each female connector portion 34 comprises a loop 42 that is integrally formed with the respective side bar during the process of fabricating the device and that cooperates with face 26 to form a rectangular walled through-hole 44 on that face opposite the respective side wall of tire 10. Each through-hole has an entrance 46 and an exit 48 and is dimensioned to allow tip 38 of the respective male connector portion 32 to readily enter entrance 46, pass through the hole, and emerge from exit 48 as the installation is being completed.

Also integrally formed in association with each loop 42 during the fabrication process is a respective pawl 50. Each pawl comprises a proximal end 51 that merges with a wall 53 of the respective loop 42 proximate the respective entrance 46. Pawl 50 also comprises a distal end that contains a finger grip tab 52 external to the through-hole proximate exit 48. Intermediate its proximal and distal ends, the pawl comprises a serrated zone 54 having a series of serrations complementary to those of serrated zone 40 of the respective side bar. In the free condition of pawl 50 prior to introduction of a tip 38 into entrance 46, the pawl serrations are disposed relative to another wall 55 of loop 42 to present an interference with the respective male connector portion 32 once that portion has passed sufficiently through the through-hole to initially engage the serrations of its zone 40 with those of the pawl while face 28 is slid along the inner surface of wall 55. The respective serrations are dimensioned to provide a ratcheting effect as the increasing width of the tapered end of the male connector portion increasingly passes through the through-hole. A formation via which proximal end 51 of pawl 50 integrally joins with the wall of loop 42 imparts a certain resilient flexibility to the pawl, much like a biased hinge or lever, that tends to naturally urge the pawl serrations in the counterclockwise sense as viewed in FIG. 5. Hence, the pawl will rock in an oscillatory manner as successive serrations of the side bars pass across successive serrations of the pawl. At completion of the connection, the male connector portions are wedged secure in the female connector portions.

As the connection of portions 32, 34 to each other is being completed, tip 38 enters and passes through a second loop 56 that is spaced along the side bar from loop 42 to form a keeper for the tip end, and as described, male connector portion 32 is securely wedged in the through-hole provided by loop 42 when the connection is complete. The specific arrangement is advantageous because as the tire rotates, centrifugal force will tend to keep the serrations mutually engaged.

While FIG. 5 shows a representative condition where several serrations of one zone are engaged with several serrations of the other, it should be appreciated that any particular number of serrations of one zone may be engaged with any particular number of the other zone, and pawl 50 has an ability to flex about its proximal end in varying degrees to accommodate such different extents to which the respective serrated zones mutually overlap. In this way, a secure connection may be made for varying degrees of insertion of the male connector portion into the female connector portion, thereby allowing slack to be taken out and the snuggest possible fit of the device on the tire obtained. The relative thinness of the device and its snug fit on the tire endow it with a low profile when installed.

The connected portions 32, 34 can be disconnected by manipulating pawl 50 to disengage its serrations from those of the male connector portion. This is done by moving gripping tab 52 in a clockwise sense as viewed in FIG. 5 to flex the pawl about its proximal end. Tab 52 may be gripped between a person's thumb and forefinger. Once the serrations have been disengaged, the two ends of the respective side bar can be separated.

If desired, the device may include traction-enhancing features, such as those marked at 60 in one of the rungs 22 in FIG. 6. Those features include any one or more of metal studs, ceramic studs, and granules of material, and such features may be incorporated in any suitable manner, such as by introduction into the polymeric material while the device is being molded. To the extent that the device may not have a fully snug fit on a tire, the relatively low mass of plastic material will tend to minimize any slinging that may occur as the wheel revolves. Although the plastic can assume a shape providing a snug fit to a tire when installed, the material may nonetheless be somewhat stiff, and that too will discourage slinging. Yet if the device does accidentally hit another component of the vehicle, the fact that the device is plastic should mitigate against any significant impact damage to such component.

The fabrication of device 16 by molding from plastic (polymeric) material allows its various constituent parts that have been described herein to be integrally formed elements of the device. This avoids the assembly of separate individual parts, and with the disclosed connectors, no tools are needed for installing and removing the device on and from a tire. However, a device that embodies principles of the invention may be designed to take advantage of tools that aid a person installing and/or removing a device on or from a tire.

It is believed that the disclosed inventive principles provide an efficient and effective way to provide improved tire traction during winter driving. In addition to advantages previously discussed, the invention is believed capable of providing devices that are relatively light in weight and that can be compactly stored when not installed.

While a presently preferred embodiment has been illustrated and described, it is to be appreciated that the invention may be practiced in various forms within the scope of the following claims.

What is claimed is:

1. A traction assist device for girdling a motor vehicle tire comprising:

a pair of side bars for fitting against opposite side walls of the tire;

a number of transverse bars extending between the side bars at intervals along the length of the side bars, each transverse bar extending from one of the side bars and across a tread of the tire to the other side bar when the device is mounted on the tire;

each side bar comprising respective ends that cooperatively form a connector for connecting the respective ends together when the device is mounted on the tire;

one end of each side bar comprising a male connector portion of the respective connector and the opposite end of each side bar comprising a female connector portion of the respective connector within which the corresponding male connector portion is received when the respective connector portions are connected together;

each male connector portion comprising a serrated zone containing serrations; and a respective pawl associated with each female connector portion and comprising a serrated zone containing serrations for engaging at least one serration of the serrated zone of the respective male connector portion with at least one serration of the serrated zone of the respective female connector portion when the device is mounted on the tire.

2. A traction assist device as set forth in claim 1 in which the female connector portion comprises a walled through-hole within which the serrated zone of the pawl is disposed, and the male connector portion comprises a taper providing for wedging of the male connector portion within the through-hole to force the serrated zones toward each other when the male connector portion is disposed within the female connector portion.

3. A traction assist device as set forth in claim 2 in which each pawl comprises a proximal end providing a resiliently flexible mounting of the pawl on the respective walled through-hole and a distal end that is external to the respective walled through-hole.

4. A traction assist device as set forth in claim 3 in which the distal end of each pawl comprises a gripping tab that can be gripped between a person's thumb and forefinger for flexing the pawl to disengage the pawl serrations from serrations of the respective male connector portion.

5. A traction assist device as set forth in claim 3 in which the serrations of each pawl face radially outward and the serrations on the respective male connector portion face radially inward.

6. A traction assist device as set forth in claim 1 in which each male connector portion includes a tip end spaced from its serrated zone and further including a loop disposed on each side bar spaced from the corresponding female connector portion to form a keeper for receiving the tip end of the respective male connector portion.

7. A traction assist device adapted for girdling a motor vehicle tire comprising:

a nominally flat polymeric part that can assume a circular shape for fitting onto a tire;

the polymeric part comprising a pair of side bars that are nominally straight, but can assume circular shapes for fitting against opposite side walls of the tire;

the polymeric part further comprising a number of transverse bars integrally joining with the side bars and extending between the side bars at intervals along the length of the side bars, each transverse bar being nominally straight, but when the device is mounted on the tire, each transverse bar fits closely against the tire, extending from one of the side bars, thence wrapping over and across a tread of the tire to the other side bar; and each side bar further comprising respective ends that cooperatively form a respective connector for connecting the respective ends together when the device is mounted on the tire.

8. A traction assist device as set forth in claim 7 in which one end of each side bar comprises a male connector portion of the respective connector and the opposite end of each side bar comprises a female connector portion of the respective connector within which the corresponding male connector portion is received when the respective connector portions are connected together;

each male connector portion and each female connector portion being integrally formed and joining with the respective side bar as an element of the polymeric part.

9. A traction assist device as set forth in claim 8 including a respective pawl associated with each female connector portion and comprising a serrated zone containing serrations for mutually engaging serrations of the serrated zone of the respective male connector portion when the device is mounted on the tire;

each pawl being integrally formed and joining with the respective female connector portion as an element of the polymeric part.

10. A traction assist device as set forth in claim 9 in which each female connector portion comprises a walled through-hole within which the serrated zone of the respective pawl is disposed, and each male connector portion comprises a taper for wedging within the respective through-hole to force the respective serrated zones against each other when the respective male connector portion is disposed within the respective female connector portion.

11. A traction assist device as set forth in claim 10 in which each pawl comprises a proximal end providing a resiliently flexible mounting of the pawl on the respective walled through-hole and a distal end that is external to the respective walled through-hole.

12. A traction assist device as set forth in claim 11 in which the distal end of each pawl comprises a gripping tab that can be gripped between a person's thumb and forefinger for flexing the pawl to disengage the pawl serrations from serrations of the respective male connector portion.

13. A traction assist device as set forth in claim 11 in which the serrations of each pawl face radially outward and the serrations on the respective male connector portion face radially inward.

14. A traction assist device as set forth in claim 8 in which each male connector portion includes a tip end spaced from its serrated zone and further including a loop disposed on each side bar spaced from the corresponding female connector portion to form a keeper for receiving the tip end of the respective male connector portion.

* * * * *